US012781902B2

(12) United States Patent
Roesner et al.

(10) Patent No.: US 12,781,902 B2
(45) Date of Patent: Nov. 3, 2026

(54) FLUID CONDUIT ASSEMBLY FOR A FLUID SUPPLY SYSTEM

(71) Applicant: Scout Surface Solutions, LLC, Joshua, TX (US)

(72) Inventors: Thomas George Roesner, Cypress, TX (US); David Lane Evans, Conroe, TX (US)

(73) Assignee: Scout Surface Solutions, LLC, Joshua, TX (US)

( * ) Notice: Subject to any disclaimer, the term of this patent is extended or adjusted under 35 U.S.C. 154(b) by 402 days.

(21) Appl. No.: 17/966,260

(22) Filed: Oct. 14, 2022

(65) Prior Publication Data

US 2023/0119473 A1 Apr. 20, 2023

Related U.S. Application Data

(60) Provisional application No. 63/255,747, filed on Oct. 14, 2021.

(51) Int. Cl.
*E21B 43/26* (2006.01)
*F16L 41/03* (2006.01)

(52) U.S. Cl.
CPC ........... *F16L 41/03* (2013.01); *E21B 43/2607* (2020.05)

(58) Field of Classification Search
CPC ............................. F16L 41/03; E21B 43/2607
See application file for complete search history.

(56) References Cited

U.S. PATENT DOCUMENTS

| | | | | |
|---|---|---|---|---|
| 9,995,102 | B2 | 6/2018 | Dille et al. | |
| 10,436,368 | B2 | 10/2019 | Kajaria et al. | |
| 10,808,512 | B2 | 10/2020 | Koricanek | |
| 10,975,677 | B2 | 4/2021 | Shampine | |
| 12,031,419 | B2 * | 7/2024 | Travis | E21B 43/2607 |
| 12,270,271 | B2 | 4/2025 | Roesner et al. | |
| 2017/0122060 | A1 | 5/2017 | Dille et al. | |
| 2017/0268306 | A1 | 9/2017 | Kajaria et al. | |
| 2018/0187508 | A1 | 7/2018 | Roesner et al. | |
| 2020/0149362 | A1 | 5/2020 | Terwilliger et al. | |
| 2023/0119473 | A1 | 4/2023 | Roesner et al. | |

OTHER PUBLICATIONS

Technipfmc, Flowline products and services, 2018, 92 pgs.
Technipfmc, iComplete Frac different: Faster. Safer. Smarter., 2020, 9 pgs.
Fet, Manifold Trailers, 2024, 2 pgs, https://f-e-t. com/stimulation/manifold-trailers/.
TSI Flow Products, BFS Manifold Skids, 2024, 10 pgs, https://www.tsiflowproducts.com/frac-flowback/missile-skids.
Weir, Spm Flow Control Product Catalog, Feb. 24, 2020, 64 pgs.
(Continued)

*Primary Examiner* — P. Macade Nichols
(74) *Attorney, Agent, or Firm* — Fletcher Yoder, P.C.

(57) ABSTRACT

A fluid conduit assembly for a fluid supply system includes a low-pressure conduit assembly. The low-pressure conduit assembly includes a low-pressure conduit, multiple low-pressure inlets, and multiple low-pressure outlets. Each low-pressure inlet includes a fluid passage configured to independently direct low-pressure fluid from a fluid source to the low-pressure conduit, and the low-pressure outlets are configured to direct the low-pressure fluid from the low-pressure conduit to multiple fluid pumps.

16 Claims, 4 Drawing Sheets

(56) References Cited

OTHER PUBLICATIONS

Weir, Oil & Gas Simplified Frac Iron System, 2018, 12 pgs.
U.S. Appl. No. 17/952,425, Non-Final Office Action, 10 pgs.
U.S. Appl. No. 17/952,425, Final Office Action, 10 pgs.
U.S. Appl. No. 19/173,366, Non-Final Office Action, dated Jan. 7, 2026, 11 pgs.
CA Application No. 3,178,881, Office Action dated Jul. 9, 2026, 5 pgs.

* cited by examiner

FLUID CONDUIT ASSEMBLY FOR A FLUID SUPPLY SYSTEM

CROSS-REFERENCE TO RELATED APPLICATION

This application claims priority from and the benefit of U.S. Provisional Application Ser. No. 63/255,747, entitled "FLUID CONDUIT ASSEMBLY FOR A FLUID SUPPLY SYSTEM", filed Oct. 14, 2021, which is hereby incorporated by reference in its entirety.

BACKGROUND

The present disclosure relates generally to a fluid conduit assembly for a fluid supply system.

Various resources (e.g., hydrocarbon gas, oil, etc.) may be extracted from subterranean formations by drilling wells into the subterranean formations. During production, one or more resources may flow from the subterranean formation to a wellhead via the well. The wellhead may include components (e.g., valves, connectors, etc.) configured to control flow of the one or more resources to storage and/or processing assemblies.

For a subterranean formation having low porosity and/or low permeability, and/or when flow of the one or more resources from a subterranean formation decreases, a well stimulation system may be employed to perform a well stimulation operation to fracture the subterranean formation, thereby increasing the flow of the one or more resources from the subterranean formation. The well stimulation system typically includes a well stimulation fluid supply system and a well stimulation tree. The well stimulation fluid supply system includes a fluid source configured to output fracturing fluid (e.g., including water, sand, proppant, acid, chemicals, additives, etc.) and one or more pumps configured to significantly increase the pressure of the fracturing fluid. The well stimulation fluid supply system is configured to output the high-pressure fracturing fluid to the well stimulation tree. The well stimulation tree is coupled to the wellhead and configured to direct the high-pressure fracturing fluid through the wellhead and the well to the subterranean formation.

Certain well stimulation fluid supply systems include a fluid conduit assembly having multiple low-pressure conduits and a high-pressure conduit. The low-pressure conduits may be disposed on opposite lateral sides of the high-pressure conduit, and the low-pressure conduits may be fluidly coupled to an inlet manifold. The inlet manifold may be configured to receive the fracturing fluid from the fluid source and to provide the fracturing fluid to the low-pressure conduits. One or more low-pressure conduits positioned on a first lateral side of the high-pressure conduit may provide the fracturing fluid to a first set of pumps on the first lateral side of the high-pressure conduit, and one or more low-pressure conduits positioned on a second lateral side of the high-pressure conduit may provide the fracturing fluid to a second set of pumps on the second lateral side of the high-pressure conduit. The pumps may significantly increase the pressure of the fracturing fluid and output the high-pressure fracturing fluid to the high-pressure conduit. The high-pressure conduit, in turn, may output the high-pressure fracturing fluid to the well stimulation tree.

BRIEF DESCRIPTION

In certain embodiments, a fluid conduit assembly for a fluid supply system includes a low-pressure conduit assembly. The low-pressure conduit assembly includes a low-pressure conduit, multiple low-pressure inlets, and multiple low-pressure outlets. Each low-pressure inlet includes a fluid passage configured to independently direct low-pressure fluid from a fluid source to the low-pressure conduit, and the low-pressure outlets are configured to direct the low-pressure fluid from the low-pressure conduit to multiple fluid pumps.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
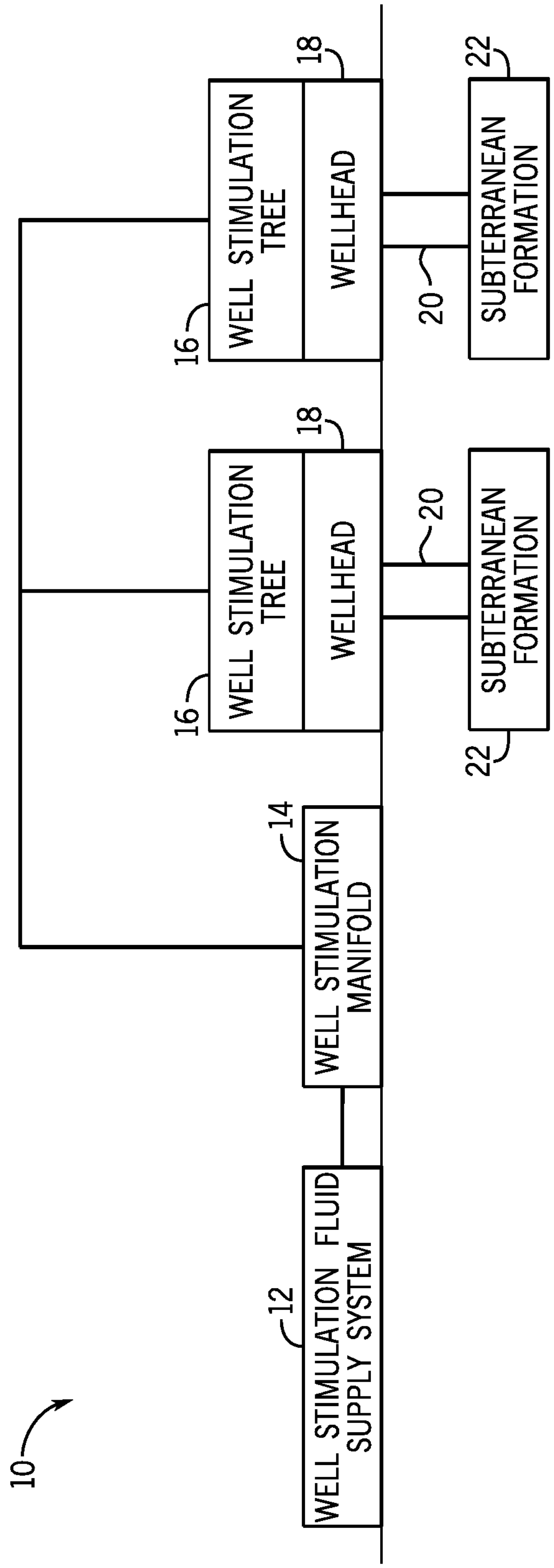
FIG. 1 is a block diagram of an embodiment of a well stimulation system.

FIG. 1 is a block diagram of an embodiment of a well stimulation system 10. In the illustrated embodiment, the well stimulation system 10 includes a well stimulation fluid supply system 12, a well stimulation manifold 14, and two well stimulation trees 16. The well stimulation fluid supply system 12 is configured to provide high-pressure fracturing fluid to the well stimulation manifold 14, and the well stimulation manifold 14, in turn, is configured to provide the high-pressure fracturing fluid to the well stimulation trees 16. As illustrated, each well stimulation tree 16 is coupled to a respective wellhead 18, and each well stimulation tree 16 is configured to direct the high-pressure fracturing fluid through the respective wellhead 18 and a respective well 20 to a respective subterranean formation 22. The high-pressure fracturing fluid may fracture the subterranean formation 22 (e.g., by increasing the size of natural fractures, by forming new fractures, etc.). As a result, the production of resources (e.g., hydrocarbon gas, oil, etc.) from the subterranean formation may be increased.

In the illustrated embodiment, the well stimulation system 10 includes two well stimulation trees 16 fluidly coupled to the well stimulation manifold 14. However, in other embodiments, the well stimulation system 10 may include more or fewer well stimulation trees (e.g., 1, 3, 4, or more) fluidly coupled to the well stimulation manifold. In addition, while the well stimulation system 10 includes a single well stimulation manifold 14 in the illustrated embodiment, in other embodiments, the well stimulation system may include additional well stimulation manifolds (e.g., in which each well stimulation manifold is fluidly coupled to one or more well stimulation trees). Furthermore, in certain embodiments, the well stimulation manifold may be omitted, and the well stimulation fluid supply system may be directly fluidly coupled to a single well stimulation tree. In embodiments having multiple well stimulation trees and no well stimulation manifold, the well stimulation fluid supply system may be fluidly coupled to each well stimulation tree individually in a cyclical/repeating pattern.

In certain embodiments, the well stimulation fluid supply 12 includes one or more fluid sources, fluid pumps, and a fluid conduit assembly. Each fluid source is configured to output a respective low-pressure fracturing fluid to the fluid conduit assembly, and the fluid conduit assembly is configured to provide the low-pressure fracturing fluid(s) to the fluid pumps. The fluid pumps are configured to significantly increase the pressure and, in certain embodiments flow rate, of the fracturing fluid(s) and to provide high-pressure fracturing fluid(s) to the fluid conduit assembly. In embodiments in which multiple fracturing fluids are provided to the conduit assembly, the conduit assembly is configured to mix the fracturing fluids into a single high-pressure fracturing fluid. In addition, the fluid conduit assembly is configured to provide the high-pressure fracturing fluid to the well stimulation tree(s).

In certain embodiments, the fluid conduit assembly includes a low-pressure conduit assembly and a high-pressure conduit assembly. The low-pressure conduit assembly includes a low-pressure conduit, one or more low-pressure inlets, and multiple low-pressure outlets. The one or more low-pressure inlets are configured to direct a low-pressure fluid (e.g., low-pressure fracturing fluid) from a fluid source to the low-pressure conduit, and the low-pressure outlets are configured to direct the low-pressure fluid from the conduit to the fluid pumps. In certain embodiments, at least one first low-pressure outlet is positioned on a first lateral side of the low-pressure conduit, and at least one second low-pressure outlet is positioned on a second lateral side of the low-pressure conduit, opposite the first lateral side. In addition, the high-pressure conduit assembly includes a high-pressure conduit, multiple high-pressure inlets, and one or more high-pressure outlets. The high-pressure inlets are configured to direct high-pressure fluid from the fluid pumps to the high-pressure conduit, and the one or more high-pressure outlets are configured to direct the high-pressure fluid toward the well (e.g., via the well stimulation manifold and the well stimulation tree). In certain embodiments, at least one first high-pressure inlet is positioned on a first lateral side of the high-pressure conduit, and at least one second high-pressure inlet is positioned on a second lateral side of the high-pressure conduit, opposite the first lateral side. Because the low-pressure outlets are disposed on both lateral sides of the low-pressure conduit, and the high-pressure inlets are disposed on both lateral sides of the high-pressure conduit, fluid pumps may be disposed on both lateral sides of the fluid conduit assembly, thereby reducing the length and width of the well stimulation fluid supply system (e.g., as compared to a fluid conduit assembly having low-pressure outlets on one side of a low-pressure conduit and/or high-pressure inlets on one side of a high-pressure conduit).

Furthermore, in certain embodiments, the low-pressure conduit assembly includes multiple low-pressure inlets. Each low-pressure inlet includes a fluid passage configured to independently direct low-pressure fluid from the fluid source to the low-pressure conduit. Accordingly, the low-pressure conduit assembly does not include an additional manifold (e.g., in addition to the low-pressure conduit) configured to collect the low-pressure fluid from multiple conduits and to direct the collected low-pressure fluid to the low-pressure conduit. As a result, the cost of the fluid conduit assembly may be substantially reduced, as compared to a low-pressure conduit assembly having an additional manifold.

While the fluid conduit assembly is disclosed herein with regard to a well stimulation system (e.g., as an element of a well stimulation fluid supply system), the fluid conduit assembly, as described herein, may also be employed within any other suitable system configured to provide fluid to a well. For example, in certain embodiments, the fluid conduit assembly may be employed within a well intervention fluid supply system of a well intervention system. The well intervention system may provide intervention fluid (e.g., including water, acid, sand, proppant, etc.) to a well to further fracture the subterranean formation, thereby increasing production of resources from the well.

Figure 2:
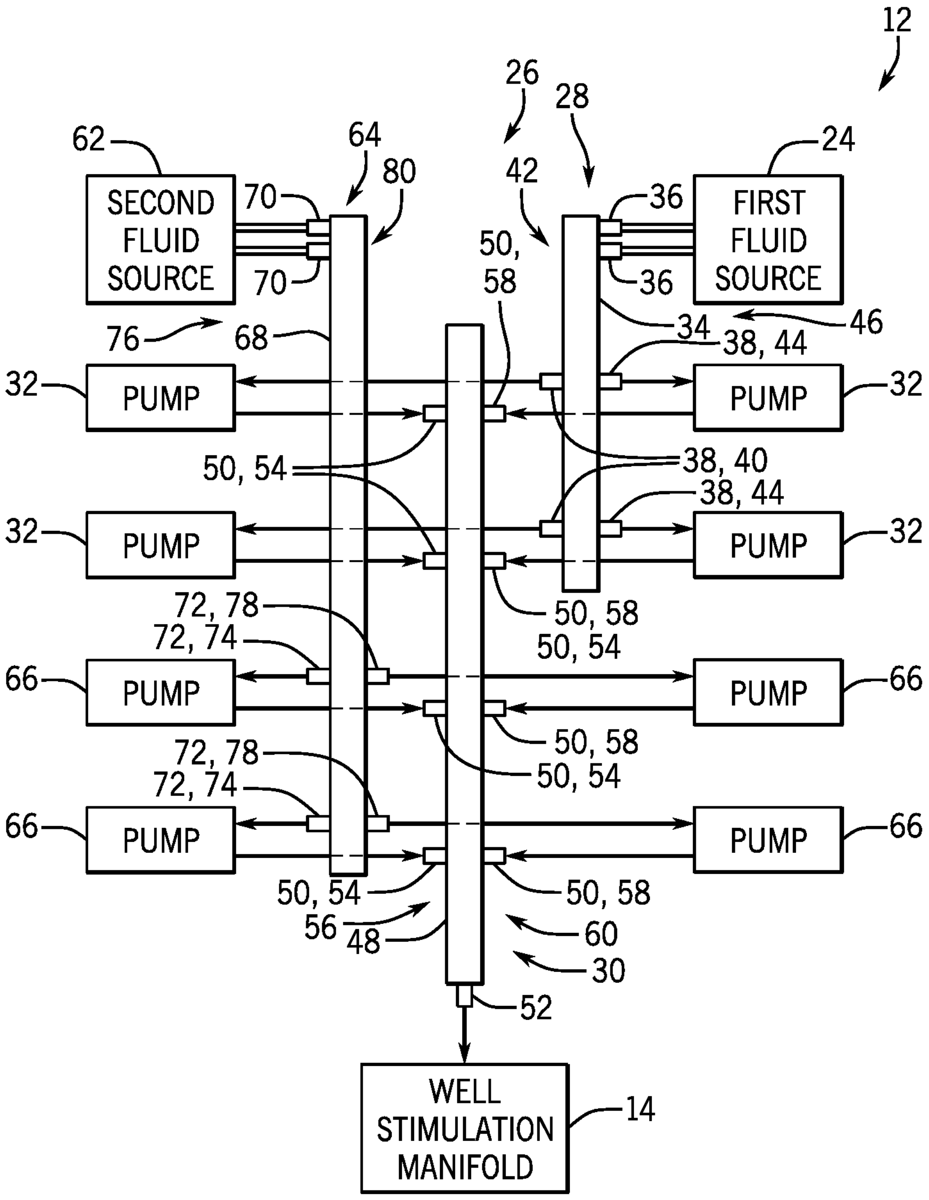
FIG. 2 is a block diagram of an embodiment of a well stimulation fluid supply system that may be employed within the well stimulation system of FIG. 1.

FIG. 2 is a block diagram of an embodiment of a well stimulation fluid supply system 12 that may be employed within the well stimulation system of FIG. 1. In the illustrated embodiment, the well stimulation fluid supply system 12 includes a first fluid source 24. The first fluid source 24 is configured to output first low-pressure fluid (e.g., first low-pressure fracturing fluid). The first fracturing fluid may include water and proppant (e.g., sand, ceramic particles, etc.). The first fracturing fluid may also include one or more chemical additives (e.g., acid, etc.). In certain embodiments, the first fluid source 24 includes a water source that may include one or more water tanks, one or more ponds, one or more pumps, other suitable component(s), or a combination thereof. In addition, in certain embodiments, the first fluid source 24 includes a blending unit configured to blend the water with the proppant and/or the chemical additives to form the first low-pressure fracturing fluid. The blending unit may also include one or more pumps configured to pump the first fracturing fluid to the fluid conduit assembly.

In addition, the well stimulation fluid supply system 12 includes a fluid conduit assembly 26 having a first low-pressure conduit assembly 28 and a high-pressure conduit assembly 30. The well stimulation fluid supply system 12 also includes multiple first fluid pumps 32. As discussed in detail below, the first low-pressure conduit assembly 28 is configured to receive the first low-pressure fluid from the first fluid source 24 and to output the first low-pressure fluid to the first fluid pumps 32, and the high-pressure conduit assembly 30 is configured to receive the first high-pressure fluid (e.g., first high-pressure fracturing fluid) from the first fluid pumps 32. Each first fluid pump 32 is configured to receive the first low-pressure fluid, substantially increase the pressure of the fluid, and output the first high-pressure fluid. In certain embodiments, one or more first fluid pumps may be mounted on a respective truck, and each truck may position the respective first fluid pump(s) at a location suitable for interfacing with the fluid conduit assembly 26.

In the illustrated embodiment, the first low-pressure conduit assembly 28 includes a low-pressure conduit 34, low-pressure inlets 36, and low-pressure outlets 38. The low-pressure inlets 36 are configured to direct the first low-pressure fluid (e.g., first low-pressure fracturing fluid) from the first fluid source 24 to the low-pressure conduit 34. For example, the low-pressure inlets 36 may receive the first low-pressure fluid from the first fluid source 24 via respective hoses and/or pipes (e.g., steel pipes, etc.). In addition, the low-pressure outlets 38 are configured to direct the first low-pressure fluid from the conduit 34 to the first fluid pumps 32. For example, the low-pressure outlets 38 may output the first low-pressure fluid to the first fluid pumps 32 via respective hoses. In the illustrated embodiment, first low-pressure outlets 40 are positioned on a first lateral side 42 of the low-pressure conduit 34, and second low-pressure outlets 44 are positioned on a second lateral side 46 of the low-pressure conduit 34, opposite the first lateral side 42.

Furthermore, in the illustrated embodiment, the high-pressure conduit assembly 30 includes a high-pressure conduit 48, high-pressure inlets 50, and a high-pressure outlet 52. Certain high-pressure inlets 50 are configured to direct the first high-pressure fluid (e.g., first high-pressure fracturing fluid) from the first fluid pumps 32 to the high-pressure conduit 48. In addition, the high-pressure outlet 52 is configured to direct high-pressure fluid toward the well(s) via the well stimulation manifold 14. As previously discussed, the well stimulation system may include any suitable number of well stimulation manifolds (e.g., one well stimulation manifold, as illustrated, or more well stimulation manifolds). In the illustrated embodiment, first high-pressure inlets 54 are positioned on a first lateral side 56 of the high-pressure conduit 48, and second high-pressure inlets 58 are positioned on a second lateral side 60 of the high-pressure conduit 48, opposite the first lateral side 56.

In the illustrated embodiment, the well stimulation fluid supply system 12 includes a second fluid source 62. The second fluid source 62 is configured to output second low-pressure fluid (e.g., second low-pressure fracturing fluid). The second fracturing fluid may include water (e.g., without proppant). In certain embodiments, the second fluid source 62 includes a water source that may include one or more water tanks, one or more ponds, one or more pumps, other suitable component(s), or a combination thereof. The second fluid source may also include one or more pumps configured to pump the second fracturing fluid to the fluid conduit assembly.

In addition, the fluid conduit assembly 26 includes a second low-pressure conduit assembly 64. The well stimulation fluid supply system 12 also includes multiple second fluid pumps 66. As discussed in detail below, the second low-pressure conduit assembly 64 is configured to receive the second low-pressure fluid from the second fluid source 62 and to output the second low-pressure fluid to the second fluid pumps 66, and the high-pressure conduit assembly 30 is configured to receive the second high-pressure fluid (e.g., second high-pressure fracturing fluid) from the second fluid pumps 66. Each second fluid pump 66 is configured to receive the second low-pressure fluid, substantially increase the pressure of the fluid, and output the second high-pressure fluid. In certain embodiments, one or more second fluid pumps may be mounted on a respective truck, and each truck may position the respective second fluid pump(s) at a location suitable for interfacing with the fluid conduit assembly 26.

In the illustrated embodiment, the second low-pressure conduit assembly 64 includes a low-pressure conduit 68 (e.g., second low-pressure conduit), low-pressure inlets 70 (e.g., second low-pressure inlets), and low-pressure outlets 72 (e.g., second low-pressure outlets). The low-pressure inlets 70 are configured to direct the second low-pressure fluid (e.g., second low-pressure fracturing fluid) from the second fluid source 62 to the low-pressure conduit 68. For example, the low-pressure inlets 70 may receive the second low-pressure fluid from the fluid source 62 via respective hoses and/or pipes (e.g., steel pipes, etc.). In addition, the low-pressure outlets 72 are configured to direct the second low-pressure fluid from the conduit 68 to the second fluid pumps 66. For example, the low-pressure outlets 72 may output the second low-pressure fluid to the second fluid pumps 66 via respective hoses. In the illustrated embodiment, first low-pressure outlets 74 are positioned on a first lateral side 76 of the low-pressure conduit 68, and second low-pressure outlets 78 are positioned on a second lateral side 80 of the low-pressure conduit 68, opposite the first lateral side 76.

Furthermore, certain high-pressure inlets 50 are configured to direct the second high-pressure fluid (e.g., second high-pressure fracturing fluid) from the second fluid pumps 66 to the high-pressure conduit 48. In addition, the high-pressure outlet 52 is configured to direct high-pressure fluid toward the well(s) via the well stimulation manifold 14. For example, the first high-pressure fluid may mix with the second high-pressure fluid within the high-pressure conduit to generate the high-pressure fluid. In certain embodiments, the first fluid may include a mixture of water and proppant, and the second fluid may include water. The flow rates of the first and second fluids may be particularly selected to achieve a desired concentration of proppant within the high-pressure fluid output to the well stimulation tree(s).

As discussed in detail below, a first distance between the low-pressure inlets 36 and the low-pressure outlets 38 of the first low-pressure conduit assembly 28 is less than a second distance between the low-pressure inlets 70 and the low-pressure outlets 72 of the second low-pressure conduit assembly 64. Accordingly, the first fluid pumps 32 may be positioned at a first longitudinal end of the fluid conduit assembly 26, and the second fluid pumps 66 may be positioned at a second longitudinal end of the fluid conduit assembly 26. Because the first distance is less than the second distance, the first low-pressure fluid travels a shorter distance along the respective low-pressure conduit than the second low-pressure fluid. As a result, the proppant travels a relatively short distance between the low-pressure inlets and the low-pressure outlets, thereby substantially reducing the possibility of proppant accumulation within the low-pressure conduit (e.g., as compared to a configuration in which the low-pressure conduits are the same length and each low-pressure conduit has low-pressure outlets distributed along the length of the low-pressure conduit).

While the well stimulation fluid supply system includes four first fluid pumps and four second fluid pumps in the illustrated embodiment, in other embodiments, the well stimulation fluid supply system may include more or fewer first fluid pumps and/or more or fewer second fluid pumps. For example, as discussed in detail below, the fluid conduit assembly may be modular, and a number of first fluid pumps, a number of corresponding low-pressure outlets of the first low-pressure conduit assembly, and a number of corresponding high-pressure inlets may be selected for a particular application. In addition, a number of second fluid pumps, a number of corresponding low-pressure outlets of the second low-pressure conduit assembly, and a number of corresponding high-pressure inlets may be selected for a particular application. The fluid conduit assembly may then be formed from modules to establish the selected number of low-pressure outlets of the first low-pressure conduit assembly, the selected number of low-pressure outlets of the second low-pressure conduit assembly, and the selected number of high-pressure inlets. Furthermore, while the low-pressure outlets are positioned on both lateral sides of each low-pressure conduit and the high-pressure inlets are positioned on both lateral sides of the high-pressure conduit in the illustrated embodiment, in other embodiments, the low-pressure outlets of at least one low-pressure conduit assembly may be positioned on a single lateral side of the respective low-pressure conduit(s), and/or the high-pressure inlets may be positioned on a single lateral side of the high-pressure conduit.

Figure 3:
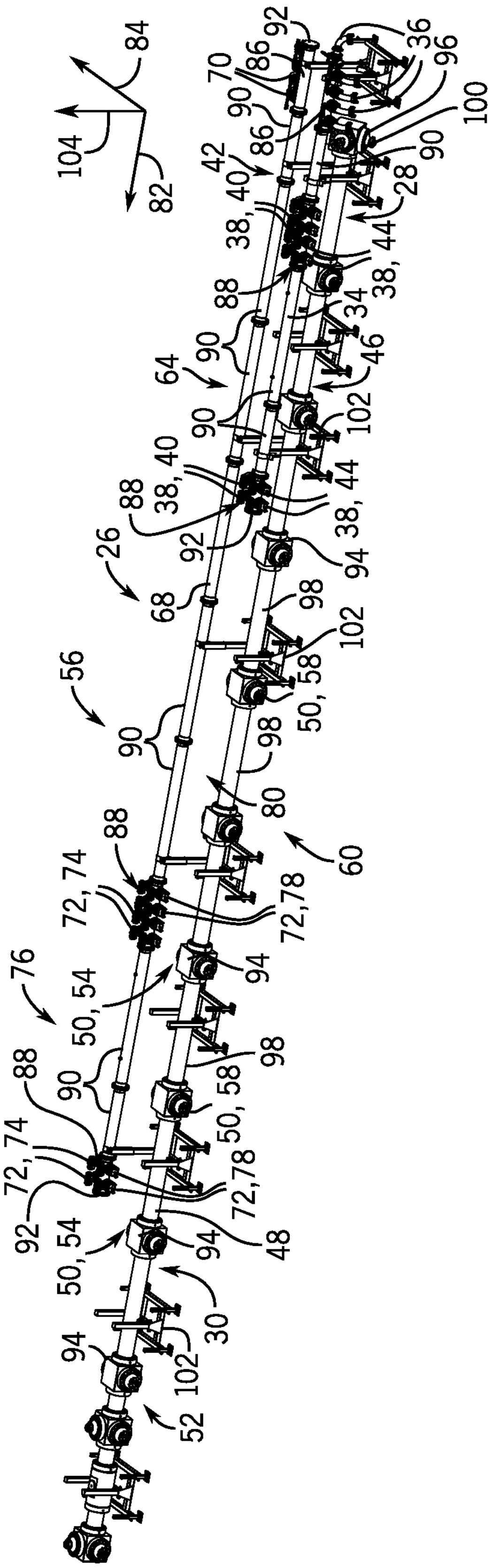
FIG. 3 is a perspective view of an embodiment of a fluid conduit assembly that may be employed within the well stimulation fluid supply system of FIG. 2.

FIG. 3 is a perspective view of an embodiment of a fluid conduit assembly 26 that may be employed within the well stimulation fluid supply system of FIG. 2. As previously discussed, the first low-pressure conduit assembly 28 includes a low-pressure conduit 34, low-pressure inlets 36, and low-pressure outlets 38. The low-pressure inlets 36 are configured to direct the first low-pressure fluid (e.g., first low-pressure fracturing fluid) from the first fluid source to the low-pressure conduit 34. In addition, the low-pressure outlets 38 are configured to direct the first low-pressure fluid from the low-pressure conduit 34 to the first fluid pumps. In the illustrated embodiment, the first low-pressure outlets 40 are positioned on the first lateral side 42 of the low-pressure conduit 34, and the second low-pressure outlets 44 are positioned on the second lateral side 46 of the low-pressure conduit 34, opposite the first lateral side 42.

In addition, the second low-pressure conduit assembly 64 includes a low-pressure conduit 68, low-pressure inlets 70, and low-pressure outlets 72. The low-pressure inlets 70 are configured to direct the second low-pressure fluid (e.g., second low-pressure fracturing fluid) from the second fluid source to the low-pressure conduit 68. In addition, the low-pressure outlets 72 are configured to direct the second low-pressure fluid from the low-pressure conduit 68 to the second fluid pumps. In the illustrated embodiment, the first low-pressure outlets 74 are positioned on the first lateral side 76 of the low-pressure conduit 68, and the second low-pressure outlets 78 are positioned on the second lateral side 80 of the low-pressure conduit 68, opposite the first lateral side 76.

Furthermore, as previously discussed, the high-pressure conduit assembly 30 includes a high-pressure conduit 48, high-pressure inlets 50, and a high-pressure outlet 52. The high-pressure inlets 50 are configured to direct the first and second high-pressure fluids (e.g., first and second high-pressure fracturing fluids) from the first and second fluid pumps to the high-pressure conduit 48. In addition, the high-pressure outlet 52 is configured to direct the high-pressure fluid (e.g., a mixture of the first and second high-pressure fluids) toward the well. In the illustrated embodiment, the first high-pressure inlets 54 are positioned on the first lateral side 56 of the high-pressure conduit 48, and the second high-pressure inlets 58 are positioned on the second lateral side 60 of the high-pressure conduit 48, opposite the first lateral side 56. In the illustrated embodiment, each first high-pressure inlet 54 is aligned with a respective opposing second high-pressure inlet 58 along a longitudinal axis of the high-pressure conduit (e.g., a longitudinal axis 82 of the fluid conduit assembly 26). However, in other embodiments, at least one first high-pressure inlet may be offset from a respective opposing second high-pressure inlet along the longitudinal axis.

In the illustrated embodiment, the first low-pressure conduit assembly 28 includes five low-pressure inlets 36. However, in other embodiments, the first low-pressure conduit assembly may include more or fewer low-pressure inlets (e.g., 1, 2, 3, 4, 6, 7, 8, 9, 10, 11, 12, or more). Furthermore, in the illustrated embodiment, the low-pressure inlets 36 are positioned on a single lateral side of the low-pressure conduit 34 (e.g., single side along a lateral axis 84) and at a longitudinal end of the low-pressure conduit 34. However, in other embodiments, the low-pressure inlets may be positioned on both lateral sides of the low-pressure conduit, and/or the low-pressure inlet positioned at the longitudinal end of the low-pressure conduit may be omitted. In addition, in the illustrated embodiment, the first low-pressure conduit assembly 28 includes four sets of low-pressure outlets 38 (e.g., two sets of four low-pressure outlets positioned closer to the low-pressure inlets, and two sets of two low-pressure outlets positioned farther from the low-pressure inlets). However, in other embodiments, the first low-pressure conduit assembly may include more or fewer sets of low-pressure outlets (e.g., one set of low-pressure outlets for each pump). Furthermore, each set of low-pressure outlets may include any suitable number of low-pressure outlets (e.g., 1, 2, 3, 4, 5, 6, or more). In addition, while the low-pressure outlets are positioned on both lateral sides of the low-pressure conduit in the illustrated embodiment, in other embodiments, the low-pressure outlets may be positioned on a single lateral side of the low-pressure conduit (e.g., second lateral side).

Furthermore, in the illustrated embodiment, the second low-pressure conduit assembly 64 includes four low-pressure inlets 70. However, in other embodiments, the second low-pressure conduit assembly may include more or fewer low-pressure inlets (e.g., 1, 2, 3, 5, 6, 7, 8, 9, 10, 11, 12, or more). Furthermore, in the illustrated embodiment, the low-pressure inlets 70 are positioned on a single lateral side of the low-pressure conduit 68 (e.g., single side along the lateral axis 84). However, in other embodiments, the low-pressure inlets may be positioned on both lateral sides of the low-pressure conduit, and/or a low-pressure inlet may be positioned at the longitudinal end of the low-pressure conduit. In addition, in the illustrated embodiment, the second low-pressure conduit assembly 64 includes four sets of low-pressure outlets 72 (e.g., two sets of four low-pressure outlets positioned closer to the low-pressure inlets, and two sets of two low-pressure outlets positioned farther from the low-pressure inlets). However, in other embodiments, the low-pressure conduit assembly may include more or fewer sets of low-pressure outlets (e.g., one set of low-pressure outlets for each pump). Furthermore, each set of low-pressure outlets may include any suitable number of low-pressure outlets (e.g., 1, 2, 3, 4, 5, 6, or more). In addition, while the low-pressure outlets are positioned on both lateral sides of the low-pressure conduit in the illustrated embodiment, in other embodiments, the low-pressure outlets may be positioned on a single lateral side of the low-pressure conduit (e.g., first lateral side).

In the illustrated embodiment, the high-pressure conduit assembly 30 includes eighteen high-pressure inlets 50. However, in other embodiments, the high-pressure conduit assembly may include more or fewer high-pressure inlets (e.g., 2, 4, 6, 8, 10, 12, 14, 16, 20, 22, 24, or more).

Furthermore, while the high-pressure inlets are positioned on both lateral sides of the high-pressure conduit in the illustrated embodiment, in other embodiments, the high-pressure inlets may be positioned on a single lateral side of the high-pressure conduit. In addition, in the illustrated embodiment, the high-pressure conduit assembly 30 includes one high-pressure outlet 52. However, in other embodiments, the high-pressure conduit assembly may include more high-pressure outlets (e.g., 2, 3, 4, 5, 6, 7, 8, or more). For example, the high-pressure conduit assembly may include one or more high-pressure outlets for each well stimulation manifold.

Each low-pressure conduit may have any suitable inner diameter. In certain embodiments, each low-pressure conduit has a substantially constant inner diameter. Accordingly, the cost of each low-pressure conduit may be substantially reduced (e.g., as compared to a low-pressure conduit having a diameter that increases or decreases along the length of the conduit from the low-pressure inlet(s) toward the low-pressure outlets). However, in other embodiments, the inner diameter of at least one low-pressure conduit may vary along the length of the low-pressure conduit (e.g., one section of the low-pressure conduit may have a larger inner diameter than another section of the low-pressure conduit). Furthermore, the low-pressure inlets of the first and second low-pressure conduit assemblies may have any suitable inner diameter(s), and the low-pressure outlets of the first and second low-pressure conduit assemblies may have any suitable inner diameter(s). Each low-pressure conduit may be configured to accommodate a variety of flow rates (e.g., about 60 to about 120 barrels/minute) and/or a variety of pressures (e.g., about 80 psi to about 120 psi).

In certain embodiments, the fluid conduit assembly may be formed from modules. In the illustrated embodiment, the first low-pressure conduit assembly 28 includes an inlet module 86, outlet modules 88, and spacer modules 90. In addition, the second low-pressure conduit assembly 64 includes an inlet module 86, outlet modules 88, and spacer modules 90. The modules of each low-pressure conduit assembly may be coupled to one another by any suitable type(s) of separable connection(s) (e.g., flanged connection(s), connection(s) established by coupler(s), threaded connection(s), a GRAYLOC® coupling, a VICTAULIC® coupling, a WECO® coupling, etc.). With regard to the first low-pressure conduit assembly 28, the inlet module 86 includes the low-pressure inlet(s) 36, each outlet module 88 includes one or more respective low-pressure outlets 38, and the spacer modules 90 are configured to establish a desired spacing between the outlet modules and between the inlet module and the outlet modules. Furthermore, with regard to the second low-pressure conduit assembly 64, the inlet module 86 includes the low-pressure inlet(s) 70, each outlet module 88 includes one or more respective low-pressure outlets 72, and the spacer modules 90 are configured to establish a desired spacing between the outlet modules and between the inlet module and the outlet modules. Each spacer module 90 may have any suitable length, such as 5 feet (1.524 m), 10 feet (3.048 m), or 20 feet (6.096 m). The length of the spacer modules may be selected (e.g., from a set of spacer modules having different lengths) to substantially align each outlet module with respective fluid pump(s), thereby reducing the length of the conduit(s) (e.g., hose(s), etc.) that fluidly couple the respective low-pressure outlet(s) to the fluid pump(s). In addition, the number of outlet modules 88 within the first low-pressure conduit assembly 28, the number of outlet modules 88 within the second low-pressure conduit assembly 64, and the number of fluid pumps may be particularly selected for a particular application (e.g., target flow rate of the high-pressure fluid). Furthermore, in the illustrated embodiment, certain outlet modules 88 have four low-pressure outlets, and other outlet modules 88 have eight low-pressure outlets. In certain embodiments, outlet modules having more or fewer low-pressure outlets (e.g., outlet modules having outlets on a single lateral side) may be employed. The type(s) of outlet module(s) utilized within each low-pressure conduit assembly may be particularly selected for a particular application.

In the illustrated embodiment, the first low-pressure conduit assembly 28 includes an end cap 92 coupled to the low-pressure conduit 34 and configured to block flow of the first low-pressure fluid from a longitudinal end of the low-pressure conduit 34. In addition, the second low-pressure conduit assembly 64 includes two end caps 92 coupled to the low-pressure conduit 68 and configured to block flow of the second low-pressure fluid from the longitudinal ends of the low-pressure conduit 68. Furthermore, in the illustrated embodiment, each outlet module 88 has a short length (e.g., longitudinal extent), such as 3 feet (0.9144 m), 4 feet (1.2192 m), or 5 feet (1.524 m). The short length of the outlet modules facilitates accurate placement of the low-pressure outlets along the respective low-pressure conduit assembly, thereby enabling the low-pressure outlets to be substantially aligned with respective fluid pumps. Furthermore, because the low-pressure outlets are formed on the outlet modules 88 and the low-pressure inlets are formed on the inlet module 86, the process of replacing worn inlet(s) and outlet(s) may involve replacing the respective module(s), thereby substantially reducing the duration and costs associated with maintenance operations. In addition, in certain embodiments, a worn section of a spacer module may be removed (e.g., by cutting out the worn section and welding the remaining sections to one another).

While the inlet/outlet modules and the spacer modules are separate components in the illustrated embodiment, in other embodiments, at least one inlet module and/or at least one outlet module may include an integrated spacer. In such embodiments, the respective spacer module(s) may be omitted and the longitudinal separation distance between respective inlets/outlets may be established by the integrated spacer(s). The integrated spacers may be available in multiple lengths to establish the desired longitudinal spacing between the respective inlets/outlets. Furthermore, in certain embodiments, at least one module may include multiple sets of low-pressure outlets separated from one another by an integral spacer. In addition, while each low-pressure conduit assembly includes the inlet module 86 and the outlet modules 88 in the illustrated embodiment, in other embodiments, the inlet module of at least one low-pressure conduit assembly may be omitted, and an outlet module (e.g., positioned at a longitudinal end of the respective low-pressure conduit assembly) may be used to receive the respective low-pressure fluid from the respective fluid source. In such embodiments, the low-pressure inlet(s) may be formed by the low-pressure outlet(s) of the outlet module. While each low-pressure conduit assembly is formed by modules in the illustrated embodiment, in other embodiments, at least one low-pressure conduit assembly may be formed by any other suitable structural configuration, such as a structural configuration having a continuous low-pressure conduit (e.g., with no connection joints along the low-pressure conduit). Furthermore, in certain embodiments, a port may be placed on a module of at least one low-pressure conduit, and the port may be in fluid communication with a pressure monitoring device (e.g., gauge, pressure transducer, etc.), thereby facilitating pressure monitoring within the respective low-pressure conduit.

In the illustrated embodiment, the high-pressure conduit assembly 30 includes inlet modules 94, a secondary multi-inlet module 96, and spacer modules 98. The modules may be coupled to one another by any suitable type(s) of separable connection(s) (e.g., flanged connection(s), connection(s) established by coupler(s), threaded connection(s), a GRAYLOC® coupling, a VICTAULIC® coupling, a WECO® coupling, etc.). The secondary multi-inlet module 96 includes multiple secondary high-pressure inlets 100, each inlet module 94 includes one or more respective high-pressure inlets 50, and the spacer modules 98 are configured to establish a desired spacing between the inlet modules and between the inlet modules and the multi-inlet module. The secondary high-pressure inlets 100 are configured to receive high-pressure fluid from one or more fluid pumps. In the illustrated embodiment, the secondary multi-inlet module 96 includes four secondary high-pressure inlets 100. However, in other embodiments, the secondary multi-inlet module may include more or fewer secondary high-pressure inlets (e.g., 1, 2, 3, 5, 6, 7, 8, or more). Furthermore, in certain embodiments, the secondary multi-inlet module may be omitted (e.g., a blind flange may be coupled to a longitudinal end of an inlet module or a spacer module). In the illustrated embodiment, the high-pressure outlet 52 is positioned at a longitudinal end of an inlet module 94. However, in other embodiments, the high-pressure outlet may be positioned at any other suitable location within the high-pressure conduit assembly. The length of the spacer modules may be selected (e.g., from a set of spacer modules having different lengths) to substantially align each inlet module with respective fluid pump(s), thereby reducing the length of the conduit(s) (e.g., hose(s), etc.) that fluidly couple the respective high-pressure inlet(s) to the fluid pump(s). In addition, the number of inlet modules 94 within the high-pressure conduit assembly 30 and the number of fluid pumps may be particularly selected for a particular application (e.g., target flow rate of the high-pressure fluid).

Because the high-pressure inlets 50 are formed on the inlet modules 94, the process of replacing worn inlet(s) may involve replacing the respective module(s), thereby substantially reducing the duration and costs associated with maintenance operations. While the inlet modules and the spacer modules are separate components in the illustrated embodiment, in other embodiments, at least one inlet module may include an integrated spacer. In such embodiments, the respective spacer module(s) may be omitted and the longitudinal separation distance between respective inlets may be established by the integrated spacer(s). The integrated spacers may be available in multiple lengths to establish the desired longitudinal spacing between the respective inlets. Furthermore, in certain embodiments, at least one module may include multiple high-pressure inlets separated from one another by an integral spacer. In addition, while the high-pressure conduit assembly is formed by modules in the illustrated embodiment, in other embodiments, the high-pressure conduit assembly may be formed by any other suitable structural configuration, such as a structural configuration having a continuous high-pressure conduit (e.g., with no connection joints along the high-pressure conduit).

In the illustrated embodiment, the first low-pressure conduit assembly 28, the second low-pressure conduit assembly 64, and the high-pressure conduit assembly 30 are supported on the ground by multiple stands 102 (e.g., which may be directly engaged with the ground). The stands 102 may be formed from any suitable material (e.g., metal, such as steel, wood, polymeric material, composite material, etc.), and the stands 102 may be positioned at any suitable locations along the longitudinal extent of the fluid conduit assembly 26. While the fluid conduit assembly 26 includes ten stands 102 in the illustrated embodiment, in other embodiments, the fluid conduit assembly may include more or fewer stands (e.g., 1, 2, 3, 4, 5, 6, 7, 8, 9, 11, 12, or more). Because the first low-pressure conduit assembly 28, the second low-pressure conduit assembly 64, and the high-pressure conduit assembly 30 are supported by stands 102 (e.g., which directly engage the ground, which engage a plate/board positioned on the ground, etc.), the manufacturing cost and setup cost of the fluid conduit assembly may be substantially reduced (e.g., as compared to a fluid conduit assembly formed on skids). For example, due to the small size of each stand and each module, lighter equipment having a lower acquisition/rental cost may be used to lift and position each component (e.g., as compared to heavier equipment having a higher acquisition/rental cost used to lift and position each skid). In addition, the stands and the modular construction of the fluid conduit assembly enable the fluid conduit assembly to be configured in the field (e.g., as compared to a fluid conduit assembly mounted on a truck, trailer, skid, platform, etc.). In certain embodiments, at least one stand may include a height adjustment system configured to control a height of the high-pressure conduit, the low-pressure conduit of the first low-pressure conduit assembly, the low-pressure conduit of the second low-pressure conduit assembly, or a combination thereof, above the ground, and/or a leveling system configured to enable the stand to accommodate an uneven/sloped ground surface.

In the illustrated embodiment, each low-pressure conduit and the high-pressure conduit are substantially linear. As used herein, "substantially linear" refers to a variation along a longitudinal axis of the respective conduit of less than 5 degrees, less than 4 degrees, less than 3 degrees, less than 2 degrees, less than 1 degree, less than 0.5 degrees, or less than 0.25 degrees. Because each conduit is substantially linear, the modules of the fluid conduit assembly may be relatively narrow, thereby facilitating transport of the modules via a truck/trailer (e.g., as compared to components with more complex shapes). However, in other embodiments, at least one low-pressure conduit and/or the high-pressure conduit may have another suitable shape (e.g., curved, bent, wavy, etc.). For example, in certain embodiments, a portion of at least one low-pressure conduit along which the low-pressure inlets are position may be curved (e.g., bent) and/or angled (e.g., at a 90 degree angle) relative to the remainder of the low-pressure conduit.

In the illustrated embodiment, a first distance between the low-pressure inlets 36 and the low-pressure outlets 38 of the first low-pressure conduit assembly 28 along the longitudinal axis of the low-pressure conduit 34 (e.g., along the longitudinal axis 82 of the fluid conduit assembly 26) is less than a second distance between the low-pressure inlets 70 and the low-pressure outlets 72 of the second low-pressure conduit assembly 64 along the longitudinal axis of the low-pressure conduit 68 (e.g., along the longitudinal axis 82 of the fluid conduit assembly 26). Accordingly, the first fluid pumps may be positioned at a first longitudinal end of the fluid conduit assembly 26, and the second fluid pumps may be positioned at a second longitudinal end of the fluid conduit assembly 26. Because the first distance is less than the second distance, the first low-pressure fluid travels a shorter distance along the respective low-pressure conduit than the second low-pressure fluid. As a result, the proppant travels a relatively short distance between the low-pressure inlets and the low-pressure outlets, thereby substantially reducing the possibility of proppant accumulation within the low-pressure conduit (e.g., as compared to a configuration in which the low-pressure conduits are the same length and each low-pressure conduit has low-pressure outlets distributed along the length of the low-pressure conduit). While the first distance is less than the second distance in the illustrated embodiment, in other embodiments, the first and second distances may be substantially equal. For example, in certain embodiments, each low-pressure conduit assembly may only include low-pressure outlets on the lateral side of the low-pressure conduit facing away from the high-pressure conduit, the low-pressure outlets of the first low-pressure conduit assembly may be fluidly coupled to first fluid pumps positioned on the first low-pressure conduit assembly side of the fluid conduit assembly, and the low-pressure outlets of the second low-pressure conduit assembly may be fluidly coupled to second fluid pumps positioned on the second low-pressure conduit assembly side of the fluid conduit assembly. Furthermore, while the first low-pressure fluid includes proppant and the second low-pressure fluid does not include proppant in the illustrated embodiment, in other embodiments, the first low-pressure fluid may not include proppant, and/or the second low-pressure fluid may include proppant.

In the illustrated embodiment, the low-pressure conduit 34 of the first low-pressure conduit assembly 28 and the low-pressure conduit 68 of the second low-pressure conduit assembly 64 are positioned above the high-pressure conduit 48 along a vertical axis 104 of the fluid conduit assembly 26. However, in other embodiments, at least one of the low-pressure conduits may be positioned below the high-pressure conduit along the vertical axis, and/or at least one of the low-pressure conduits may be positioned at the same position as the high-pressure conduit along the vertical axis. Furthermore, while the low-pressure conduit 34 of the first low-pressure conduit assembly 28 and the low-pressure conduit 68 of the second low-pressure conduit assembly 64 are positioned on opposite lateral sides of the high-pressure conduit 48 in the illustrated embodiment, in other embodiments, the low-pressure conduits may be positioned on the same lateral side of the high-pressure conduit.

Figure 4:
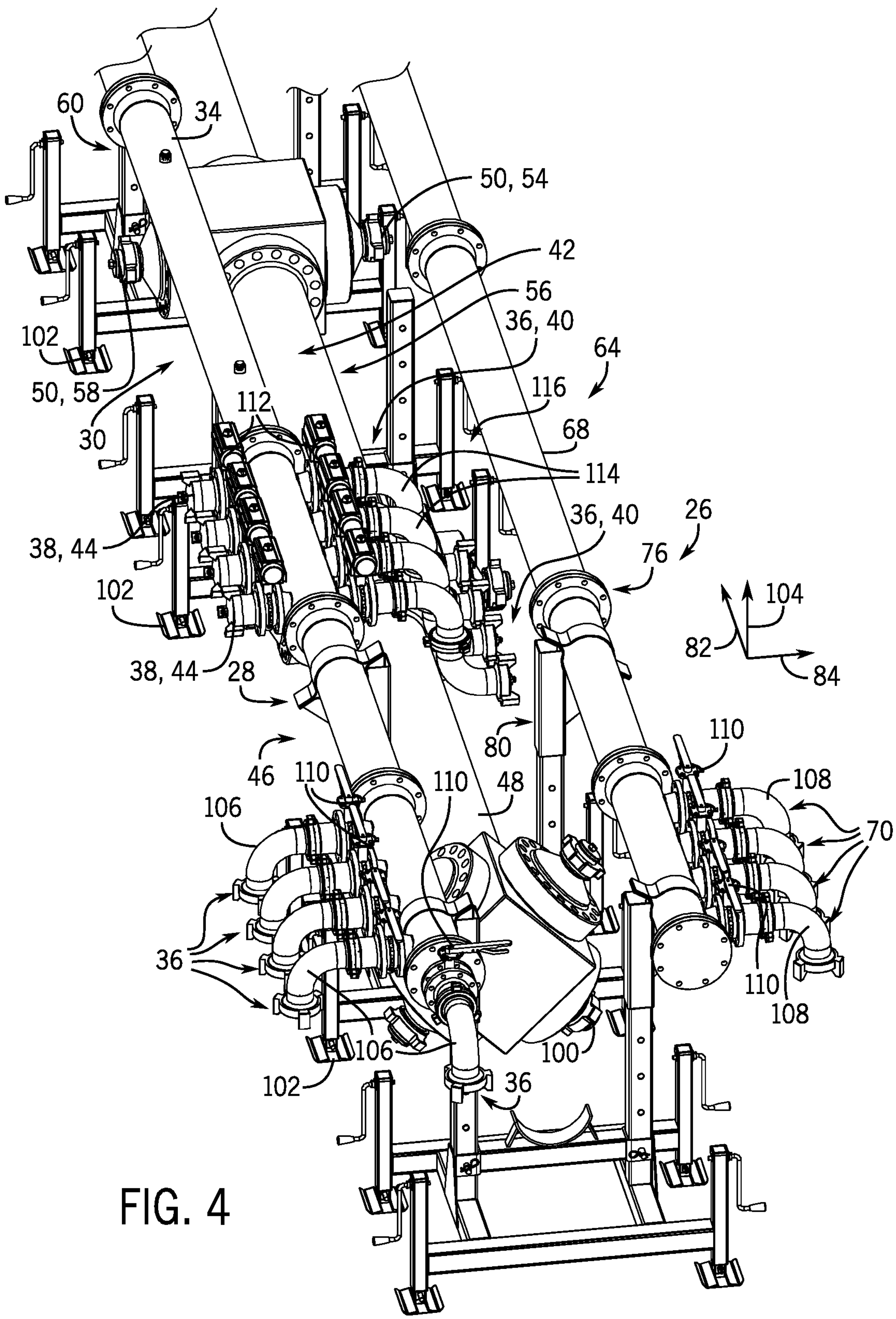
FIG. 4 is a perspective view of a portion of the fluid conduit assembly of FIG. 3.

FIG. 4 is a perspective view of a portion of the fluid conduit assembly 26 of FIG. 3. In the illustrated embodiment, each low-pressure inlet 36 includes a fluid passage 106 configured to independently direct the first low-pressure fluid from the first fluid source to the low-pressure conduit 34. Accordingly, the first low-pressure conduit assembly does not include an additional manifold (e.g., in addition to the low-pressure conduit) configured to collect the first low-pressure fluid from multiple conduits and to direct the collected first low-pressure fluid to the low-pressure conduit. In addition, each low-pressure inlet 70 includes a fluid passage 108 configured to independently direct the second low-pressure fluid from the second fluid source to the second low-pressure conduit 68. Accordingly, the second low-pressure conduit assembly does not include an additional manifold (e.g., in addition to the low-pressure conduit) configured to collect the second low-pressure fluid from multiple conduits and to direct the collected second low-pressure fluid to the low-pressure conduit. As a result, the cost of the fluid conduit assembly may be substantially reduced, as compared to a fluid conduit assembly including at least one low-pressure conduit assembly having an additional manifold.

In the illustrated embodiment, each fluid passage 106 of the first low-pressure conduit assembly 28, except the fluid passage positioned at the longitudinal end of the low-pressure conduit 34, extends substantially perpendicularly to the low-pressure conduit 34 (e.g., along the lateral axis 84), and each fluid passage 108 of the second low-pressure conduit assembly 64 extends substantially perpendicularly to the low-pressure conduit 68 (e.g., along the lateral axis 84). Furthermore, in the illustrated embodiment, each fluid passage 106 of the first low-pressure conduit assembly 28 and each fluid passage 108 of the second low-pressure conduit assembly 64 is curved and angled toward the ground (e.g., such that an entrance opening of the fluid passage is substantially parallel to the ground). However, in other embodiments, at least one fluid passage may have any other suitable shape/configuration and/or orientation. For example, at least one fluid passage may extend laterally outward from the respective low-pressure conduit along a path substantially parallel to the ground (e.g., such that an entrance opening of the fluid passage is substantially perpendicular to the ground). Furthermore, in certain embodiments, at least one fluid passage may be oriented at any suitable angle about the vertical axis, the longitudinal axis, the lateral axis, or a combination thereof, of the respective low-pressure conduit. While each low-pressure conduit assembly includes low-pressure inlets on a single side of the respective low-pressure conduit in the illustrated embodiment, in other embodiments, at least one low-pressure conduit assembly may include low-pressure inlets positioned on both lateral sides of the respective low-pressure conduit. In addition, in the illustrated embodiment, each low-pressure inlet 36 of the first low-pressure conduit assembly 28 and each low-pressure inlet 70 of the second low-pressure conduit assembly 64 includes a respective valve 110 (e.g., manually actuated valve, electrically actuated valve, etc.) configured to control flow of the respective low-pressure fluid into the respective low-pressure conduit. However, in other embodiments, the valve may be omitted from at least one low-pressure inlet.

Furthermore, each low-pressure inlet of the fluid conduit assembly may be positioned at any suitable circumferential location along the respective low-pressure conduit, and the respective fluid passage may be oriented at any suitable angle about the vertical axis, the longitudinal axis, the lateral axis, or a combination thereof, of the respective low-pressure conduit. For example, in certain embodiments, at least one low-pressure inlet of at least one low-pressure conduit assembly may be positioned at the bottom of the respective low-pressure conduit, and the respective fluid passage(s) may extend substantially along the vertical axis (e.g., such that the entrance opening(s) of the respective fluid passage(s) are substantially parallel to the ground). In addition, in certain embodiments, two or more low-pressure inlets may be distributed about the circumferential extent of a respective low-pressure conduit. For example, in certain embodiments, three low-pressure inlets may be substantially aligned with one another along the longitudinal axis of the respective low-pressure conduit and circumferentially offset from one another by about 120 degrees. Furthermore, in certain embodiments, four low-pressure inlets may be substantially aligned with one another along the longitudinal axis of the respective low-pressure conduit and circumferentially offset from one another by about 90 degrees. In addition, at least one low-pressure conduit assembly may include a first group of low-pressure inlets positioned at a first longitudinal location along the respective low-pressure conduit and a second group of low-pressure inlets positioned at a second longitudinal location along the respective low-pressure conduit. In such embodiments, the low-pressure inlets of each group may be substantially equally spaced apart from one another along the circumferential axis of the respective low-pressure conduit, and each low-pressure inlet of the first group may be circumferentially offset from a respective low-pressure inlet of the second group (e.g., such that the circumferential offsets between the low-pressure inlets of the groups are substantially equal). While fluid passages configured to independently direct the low-pressure fluid from each respective fluid source to a respective low-pressure conduit are disclosed herein with regard to the low-pressure inlets of the first and second low-pressure conduit assembly, the fluid passages disclosed herein may be employed within any other suitable type of low-pressure conduit assembly (e.g., within any or all of the low-pressure conduit assemblies of a fluid conduit assembly having three or more low-pressure conduit assemblies).

As previously discussed, the first low-pressure conduit assembly 28 includes four sets of low-pressure outlets 38, in which two sets of four low-pressure outlets 38 are positioned closer to the low-pressure inlets 36, and two sets of two low-pressure outlets 38 are positioned farther from the low-pressure inlets 36. In addition, the second low-pressure conduit assembly 64 includes four sets of low-pressure outlets, in which two sets of four low-pressure outlets are positioned closer to the low-pressure inlets, and two sets of two low-pressure outlets are positioned farther from the low-pressure inlets. However, in other embodiments, each low-pressure conduit assembly may include more or fewer sets of low-pressure outlets (e.g., one set of low-pressure outlets for each pump). Furthermore, each set of low-pressure outlets may include any suitable number of low-pressure outlets (e.g., 1, 2, 3, 4, 5, 6, or more). In the illustrated embodiment, each first low-pressure outlet 40 of the first low-pressure conduit assembly 28 is aligned with a respective opposing second low-pressure outlet 44 along the longitudinal axis of the low-pressure conduit (e.g., along the longitudinal axis 82 of the fluid conduit assembly). In addition, each first low-pressure outlet of the second low-pressure conduit assembly 64 is aligned with a respective opposing second low-pressure outlet along the longitudinal axis of the low-pressure conduit (e.g., along the longitudinal axis 82 of the fluid conduit assembly). However, in other embodiments, at least one first low-pressure outlet may be offset from a respective opposing second low-pressure outlet along the respective longitudinal axis. In addition, in the illustrated embodiment, each low-pressure outlet includes a respective valve 112 (e.g., manually actuated valve, electrically actuated valve, etc.) configured to control flow of the respective low-pressure fluid from the respective low-pressure conduit. However, in other embodiments, the valve may be omitted from at least one low-pressure outlet.

In the illustrated embodiment, each first low-pressure outlet 40 of the first low-pressure conduit assembly 28 includes a respective fluid passage 114 extending to a region 116 between the low-pressure conduit 68 of the second low-pressure conduit assembly 64 and the high-pressure conduit 48 along the vertical axis 104. Each fluid passage 114 is configured to direct the first low-pressure fluid from the low-pressure conduit 34 to/toward a respective first fluid pump. In the illustrated embodiment, each fluid passage 114 extends substantially perpendicularly from the low-pressure conduit 34 (e.g., along the lateral axis 84). Furthermore, each fluid passage 114 is curved to position an exit opening of the fluid passage between the low-pressure conduit 68 of the second low-pressure conduit assembly 64 and the high-pressure conduit 48 along the vertical axis 104. In the illustrated embodiment, the exit opening of each fluid passage 114 is substantially perpendicular to the ground. However, the exit opening of at least one fluid passage may be oriented at any other suitable angle relative to the ground. Positioning the exit opening of each fluid passage 114 between the low-pressure conduit 68 of the second low-pressure conduit assembly 64 and the high-pressure conduit 48 along the vertical axis 104 enables a hose or pipe to be connected to the respective low-pressure outlet, thereby enabling flow of the first low-pressure fluid from the low-pressure conduit 34 to a respective first fluid pump. Furthermore, in certain embodiments, at least one second low-pressure outlet of the first low-pressure conduit assembly, at least one first low-pressure outlet of the second low-pressure conduit assembly, at least one second low-pressure outlet of the second low-pressure conduit assembly, or a combination thereof, may include a respective fluid passage. Each fluid passage may have any suitable shape/configuration and/or orientation (e.g., the fluid passage of at least one first low-pressure outlet of the first low-pressure conduit assembly may have another suitable shape/configuration and/or orientation). For example, at least one fluid passage may extend laterally outward from the respective low-pressure conduit along a path substantially parallel to the ground (e.g., such that an exit opening of the fluid passage is substantially perpendicular to the ground). Furthermore, in certain embodiments, at least one fluid passage may be oriented at any suitable angle about the vertical axis, the longitudinal axis, the lateral axis, or a combination thereof. While each low-pressure conduit assembly includes low-pressure outlets on both sides of the respective low-pressure conduit in the illustrated embodiment, in other embodiments, at least one low-pressure conduit assembly may include low-pressure outlets positioned on a single lateral side of the respective low-pressure conduit.

In the illustrated embodiment, the opposing low-pressure outlets of each pair of opposing low-pressure outlets are circumferentially offset from one another by about 180 degrees. However, in other embodiments, the opposing low-pressure outlets of at least one pair of opposing low-pressure outlets may be circumferentially offset from one another by any suitable angle (e.g., about 20 degrees, about 40 degrees, about 60 degrees, about 80 degrees, about 90 degrees, about 100 degrees, about 120 degrees, about 140 degrees, about 160 degrees, etc.). Furthermore, each low-pressure outlet of the fluid conduit assembly may be positioned at any suitable circumferential location along the respective low-pressure conduit, and the respective fluid passage may be oriented at any suitable angle about the vertical axis, the longitudinal axis, the lateral axis, or a combination thereof, of the respective low-pressure conduit. In addition, in certain embodiments, three or more low-pressure outlets may be distributed about the circumferential extent of the respective low-pressure conduit. For example, in certain embodiments, three low-pressure outlets may be substantially aligned with one another along the longitudinal axis of the respective low-pressure conduit and circumferentially offset from one another by about 120 degrees. Furthermore, in certain embodiments, four low-pressure outlets may be substantially aligned with one another along the longitudinal axis of the respective low-pressure conduit and circumferentially offset from one another by about 90 degrees. In addition, at least one low-pressure conduit assembly may include a first group of low-pressure outlets positioned at a first longitudinal location along the respective low-pressure conduit and a second group of low-pressure outlets positioned at a second longitudinal location along the respective low-pressure conduit. In such embodiments, the low-pressure outlets of each group may be substantially equally spaced apart from one another along the circumferential axis of the respective low-pressure conduit, and each low-pressure outlet of the first group may be circumferentially offset from a respective low-pressure outlet of the second group (e.g., such that the circumferential offsets between the low-pressure outlets of the groups are substantially equal).

In the embodiments disclosed above, each low-pressure inlet, except the low-pressure inlet positioned at the longitudinal end of the low-pressure conduit of the first low-pressure conduit assembly, is disposed on a lateral side (e.g., first lateral side or second lateral side) of the respective low-pressure conduit, each low-pressure outlet is disposed on a lateral side (e.g., first lateral side or second lateral side) of the respective low-pressure conduit, and each high-pressure inlet is disposed on a lateral side (e.g., first lateral side or second lateral side) of the high-pressure conduit. However, in certain embodiments, at least one low-pressure inlet (e.g., in addition to the low-pressure inlet positioned at the longitudinal end of the low-pressure conduit of the first low-pressure conduit assembly), at least one low-pressure outlet, at least one high-pressure inlet, or a combination thereof, may be positioned on another suitable side of the respective conduit (e.g., a vertical side, etc.). For example, in certain embodiments, certain low-pressure outlets (e.g., all of the low-pressure outlets, etc.) may be positioned on opposite vertical sides of the respective low-pressure conduit. As used herein, "side of the [low-pressure/high-pressure] conduit" refers to a side of a plane extending through the longitudinal axis of the respective conduit.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A fluid conduit assembly for a fluid supply system, comprising:

a low-pressure conduit assembly comprising a substantially linear low-pressure conduit, a plurality of low-pressure inlets, and a plurality of low-pressure outlets, wherein each low-pressure inlet of the plurality of low-pressure inlets comprises a fluid passage configured to independently direct low-pressure fluid from a fluid source to the substantially linear low-pressure conduit, and the plurality of low-pressure outlets is configured to direct the low-pressure fluid from the substantially linear low-pressure conduit to a plurality of fluid pumps; and a second low-pressure conduit assembly comprising a second low-pressure conduit, a plurality of second low-pressure inlets, and a plurality of second low-pressure outlets, wherein each second low-pressure inlet of the plurality of second low-pressure inlets comprises a fluid passage configured to independently direct second low-pressure fluid from a second fluid source to the second low-pressure conduit, and the plurality of second low-pressure outlets is configured to direct the second low-pressure fluid from the second low-pressure conduit to a plurality of second fluid pumps.

2. The fluid conduit assembly of claim 1, comprising:

a high-pressure conduit assembly comprising a high-pressure conduit, a plurality of high-pressure inlets, and at least one high-pressure outlet, wherein the plurality of high-pressure inlets is configured to direct high-pressure fluid from the plurality of fluid pumps to the high-pressure conduit, and the at least one high-pressure outlet is configured to direct the high-pressure fluid toward a well.

3. The fluid conduit assembly of claim 2, wherein the low-pressure conduit assembly and the high-pressure conduit assembly are supported on a ground by a plurality of stands.

4. The fluid conduit assembly of claim 1, wherein at least one first low-pressure outlet of the plurality of low-pressure outlets is positioned on a first side of the substantially linear low-pressure conduit, and at least one second low-pressure outlet of the plurality of low-pressure outlets is positioned on a second side of the substantially linear low-pressure conduit, opposite the first side of the substantially linear low-pressure conduit.

5. The fluid conduit assembly of claim 1, wherein a first distance between the plurality of low-pressure inlets and the plurality of low-pressure outlets is less than a second distance between the plurality of second low-pressure inlets and the plurality of second low-pressure outlets.

6. The fluid conduit assembly of claim 1, wherein the second low-pressure conduit is substantially linear.

7. The fluid conduit assembly of claim 1, wherein at least one first low-pressure outlet of the plurality of second low-pressure outlets is positioned on a first side of the second low-pressure conduit, and at least one second low-pressure outlet of the plurality of second low-pressure outlets is positioned on a second side of the second low-pressure conduit, opposite the first side of the second low-pressure conduit.

8. A fluid conduit assembly for a fluid supply system, comprising:

a low-pressure conduit assembly comprising a substantially linear low-pressure conduit, at least one low-pressure inlet, and a plurality of low-pressure outlets, wherein the at least one low-pressure inlet is configured to direct low-pressure fluid from a fluid source to the substantially linear low-pressure conduit, the plurality of low-pressure outlets is configured to direct the low-pressure fluid from the substantially linear low-pressure conduit to a plurality of fluid pumps, at least one first low-pressure outlet of the plurality of low-pressure outlets is positioned on a first side of the substantially linear low-pressure conduit, and at least one second low-pressure outlet of the plurality of low-pressure outlets is positioned on a second side of the substantially linear low-pressure conduit, opposite the first side of the substantially linear low-pressure conduit.

9. The fluid conduit assembly of claim 8, comprising:

a second low-pressure conduit assembly comprising a second low-pressure conduit, at least one second low-pressure inlet, and a plurality of second low-pressure outlets, wherein the at least one second low-pressure inlet is configured to direct second low-pressure fluid from a second fluid source to the second low-pressure conduit, and the plurality of second low-pressure outlets is configured to direct the second low-pressure fluid from the second low-pressure conduit to a plurality of second fluid pumps.

10. The fluid conduit assembly of claim 9, wherein at least one first low-pressure outlet of the plurality of second low-pressure outlets is positioned on a first side of the second low-pressure conduit, and at least one second low-pressure outlet of the plurality of second low-pressure outlets is positioned on a second side of the second low-pressure conduit, opposite the first side of the second low-pressure conduit.

11. The fluid conduit assembly of claim 9, wherein the second low-pressure conduit is substantially linear.

12. A fluid conduit assembly for a fluid supply system, comprising:

a low-pressure conduit assembly comprising a substantially linear low-pressure conduit, at least one low-pressure inlet, and a plurality of low-pressure outlets, wherein the at least one low-pressure inlet is configured to direct low-pressure fluid from a fluid source to the substantially linear low-pressure conduit, the plurality of low-pressure outlets is configured to direct the low-pressure fluid from the substantially linear low-pressure conduit to a plurality of fluid pumps, at least one first low-pressure outlet of the plurality of low-pressure outlets is positioned on a first side of the substantially linear low-pressure conduit, and at least one second low-pressure outlet of the plurality of low-pressure outlets is positioned on a second side of the substantially linear low-pressure conduit, opposite the first side of the substantially linear low-pressure conduit; and a high-pressure conduit assembly comprising a high-pressure conduit, a plurality of high-pressure inlets, and at least one high-pressure outlet, wherein the plurality of high-pressure inlets is configured to direct high-pressure fluid from the plurality of fluid pumps to the high-pressure conduit, the at least one high-pressure outlet is configured to direct the high-pressure fluid toward a well, at least one first high-pressure inlet of the plurality of high-pressure inlets is positioned on a first side of the high-pressure conduit, and at least one second high-pressure inlet of the plurality of high-pressure inlets is positioned on a second side of the high-pressure conduit, opposite the first side of the high-pressure conduit.

13. The fluid conduit assembly of claim 12, comprising:

a second low-pressure conduit assembly comprising a second low-pressure conduit, at least one second low-pressure inlet, and a plurality of second low-pressure outlets, wherein the at least one second low-pressure inlet is configured to direct second low-pressure fluid from a second fluid source to the second low-pressure conduit, and the plurality of second low-pressure outlets is configured to direct the second low-pressure fluid from the second low-pressure conduit to a plurality of second fluid pumps.

14. The fluid conduit assembly of claim 13, wherein the at least one first low-pressure outlet comprises a fluid passage extending to a region between the second low-pressure conduit and the high-pressure conduit along a vertical axis.

15. The fluid conduit assembly of claim 13, wherein the second low-pressure conduit is substantially linear.

16. The fluid conduit assembly of claim 12, wherein the low-pressure conduit assembly and the high-pressure conduit assembly are supported on a ground by a plurality of stands.

* * * * *